(12) United States Patent
Dinerstein et al.

(10) Patent No.: US 10,339,423 B1
(45) Date of Patent: Jul. 2, 2019

(54) SYSTEMS AND METHODS FOR GENERATING TRAINING DOCUMENTS USED BY CLASSIFICATION ALGORITHMS

(71) Applicant: Symantec Corporation, Mountain View, CA (US)

(72) Inventors: Jonathan J. Dinerstein, Draper, UT (US); Christian Larsen, Orem, UT (US); Daniel Hardman, American Fork, UT (US)

(73) Assignee: Symantec Corporation, Mountain View, CA (US)

( * ) Notice: Subject to any disclaimer, the term of this patent is extended or adjusted under 35 U.S.C. 154(b) by 150 days.

(21) Appl. No.: 15/621,452

(22) Filed: Jun. 13, 2017

(51) Int. Cl.
*G06K 9/00* (2006.01)
*G06K 9/62* (2006.01)
*G06F 17/27* (2006.01)
*G06F 17/28* (2006.01)

(52) U.S. Cl.
CPC ....... *G06K 9/6256* (2013.01); *G06F 17/2705* (2013.01); *G06F 17/2845* (2013.01)

(58) Field of Classification Search
CPC .............. G06K 9/6256; G06F 17/2705; G06F 17/2845
See application file for complete search history.

(56) References Cited

U.S. PATENT DOCUMENTS

| 7,028,250 | B2 * | 4/2006 | Ukrainczyk | .......... G06F 17/218 715/202 |
| 8,438,009 | B2 * | 5/2013 | Amini | ............... G06F 17/30707 704/8 |
| 9,645,988 | B1 * | 5/2017 | Warren | ................. G06F 17/277 |
| 2008/0040094 | A1 * | 2/2008 | Wolgemuth | .......... G06F 17/289 704/2 |
| 2012/0278336 | A1 * | 11/2012 | Malik | ................. G06F 17/2775 707/748 |
| 2017/0315984 | A1 * | 11/2017 | Goyal | ................... G06F 17/277 |
| 2018/0341630 | A1 * | 11/2018 | Devries | ............... G06F 17/2247 |

* cited by examiner

*Primary Examiner* — Gregory M Desire
(74) *Attorney, Agent, or Firm* — FisherBroyles, LLP

(57) ABSTRACT

The disclosed computer-implemented method for generating training documents used by classification algorithms may include (i) identifying a set of training documents used by a classification system to classify documents written in a first language, (ii) generating a list of tokens from within the training documents that indicate critical terms representative of classes defined by the classification system, (iii) translating the list of tokens from the first language to a second language, (iv) creating, based on the translated tokens, a set of simulated training documents that enables the classification system to classify documents written in the second language, and (v) classifying an additional document written in the second language based on the set of simulated training documents. Various other methods, systems, and computer-readable media are also disclosed.

18 Claims, 7 Drawing Sheets

SYSTEMS AND METHODS FOR GENERATING TRAINING DOCUMENTS USED BY CLASSIFICATION ALGORITHMS

BACKGROUND

Classification systems may sort or categorize a variety of types of documents, files, messages, and other portions of data. For example, a classifier may distinguish between malicious and non-malicious files, archive documents within a database, or sort emails received by a messaging service. Many classification systems analyze documents using a semi-autonomous model or algorithm (e.g., a machine learning algorithm) that compares features of the documents with typical and/or representative traits of various document classes. Such algorithms may identify distinctive traits of different classes by examining a large set of example documents (e.g., a corpus).

Classification systems generally require copious numbers (e.g., thousands, if not millions) of training documents to learn how to accurately and efficiently classify documents. Unfortunately, traditional methods for gathering corpora used by classification algorithms may require extensive time and/or resources. For example, a conventional classifier may depend on human experts to hand-select each document used to train a machine learning algorithm. This process may require thousands of hours of work and is often cost prohibitive for many classification services. The instant disclosure, therefore, identifies and addresses a need for systems and methods for generating training documents used by classification algorithms.

SUMMARY

As will be described in greater detail below, the instant disclosure describes various systems and methods for generating training documents used by classification algorithms. In one example, a method for generating training documents used by classification algorithms may include (i) identifying a set of training documents used by a classification system to classify documents written in a first language, (ii) generating a list of tokens from within the training documents that indicate critical terms representative of classes defined by the classification system, (iii) translating the list of tokens from the first language to a second language, (iv) creating, based on the translated tokens, a set of simulated training documents that enables the classification system to classify documents written in the second language, and (v) classifying an additional document written in the second language based on the set of simulated training documents.

In some examples, generating the list of tokens may include identifying phrases that are used with at least a certain frequency within the set of training documents. Additionally or alternatively, generating the list of tokens may include identifying non-linguistic tokens that indicate types of content within the set of training documents.

In some embodiments, translating the list of tokens may include (i) determining linguistic properties of at least one token by analyzing a context in which the token is used within the set of training documents and (ii) retaining the linguistic properties of the token during translation. The linguistic properties may include a denotation of the token, a connotation of the token, and/or a syntactic structure of the token. In addition, translating the list of tokens may be performed using fewer computing resources than are required to translate the set of training documents.

In some examples, creating the set of simulated training documents may include structuring at least one simulated training document based on a structure of a training document within the set of training documents. Additionally or alternatively, creating the set of simulated training documents may include distributing a token, after the token has been translated, throughout a simulated training document based on a distribution of the token throughout a training document. In some embodiments, creating the set of simulated training documents may also include (i) identifying, within the set of training documents, noise signals that include non-token terms that reduce a statistical significance of at least one token and then (ii) replicating the noise signals within the set of simulated training documents.

Additionally or alternatively, creating the set of simulated training documents may include placing non-token terms between the translated tokens within the simulated training documents such that the translated tokens are not directly adjacent to other translated tokens. Moreover, the set of simulated training documents may represent fake documents that contain text in the second language but do not contain content that is comprehensible by a speaker of the second language.

In one embodiment, a system for generating training documents used by classification algorithms may include several modules stored in memory, including (i) an identification module that identifies a set of training documents used by a classification system to classify documents written in a first language, (ii) a token module that generates a list of tokens from within the training documents that indicate critical terms representative of classes defined by the classification system, (iii) a translation module that translates the list of tokens from the first language to a second language, (iv) a simulation module that creates, based on the translated tokens, a set of simulated training documents that enables the classification system to classify documents written in the second language, and (v) a classification module that classifies an additional document written in the second language based on the set of simulated training documents. In addition, the system may include at least one physical processor configured to execute the identification module, the token module, the translation module, the simulation module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a set of training documents used by a classification system to classify documents written in a first language, (ii) generate a list of tokens from within the training documents that indicate critical terms representative of classes defined by the classification system, (iii) translate the list of tokens from the first language to a second language, (iv) create, based on the translated tokens, a set of simulated training documents that enables the classification system to classify documents written in the second language, and (v) classify an additional document written in the second language based on the set of simulated training documents.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
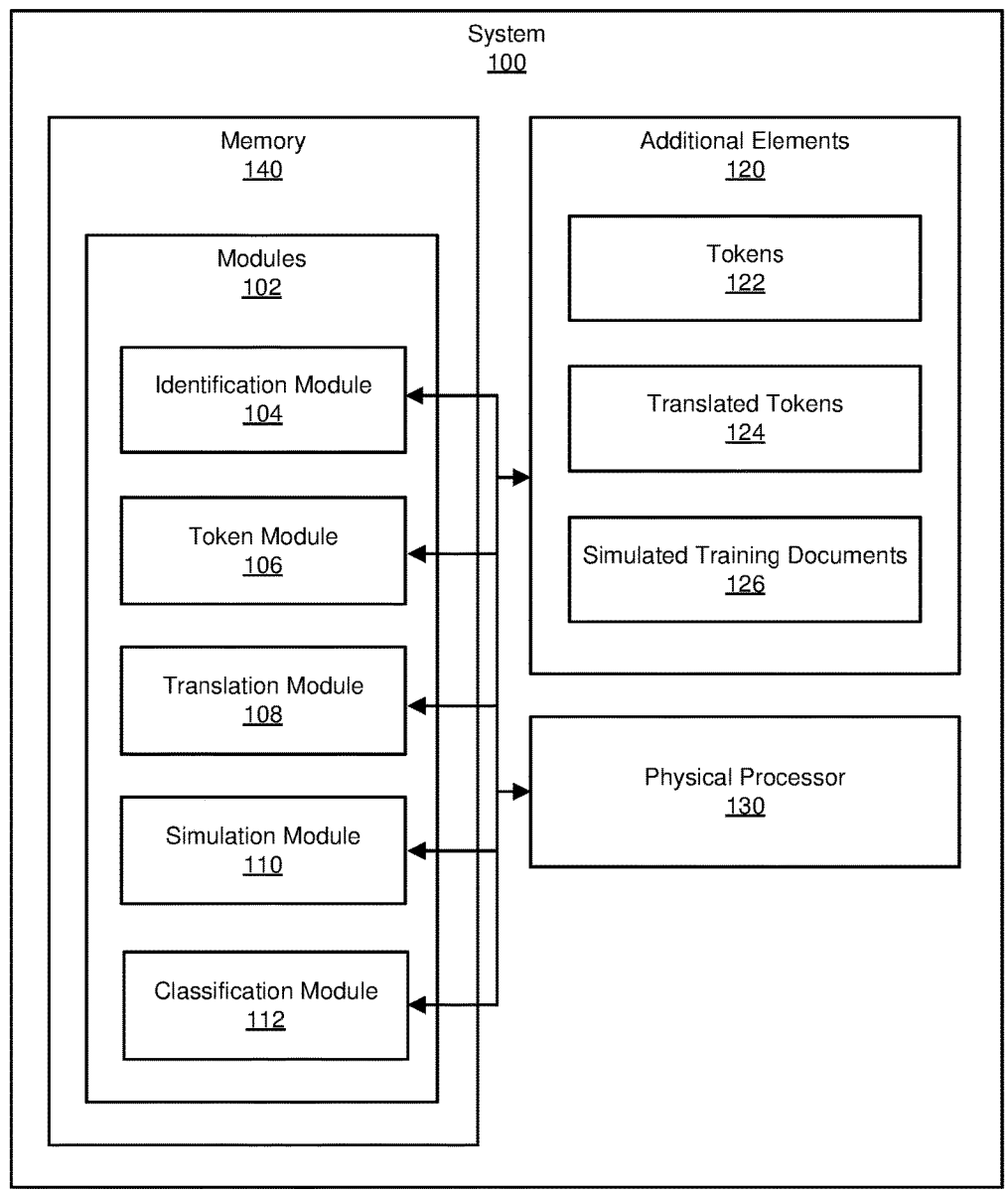
FIG. 1 is a block diagram of an example system for generating training documents used by classification algorithms.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for generating training documents used by classification algorithms. As will be explained in greater detail below, the disclosed systems and methods may identify critical (e.g., statistically significant) terms within a set of training documents used to train a classification system and then translate the terms into a different language. In addition, the systems and methods described herein may generate fake training documents based on the translated tokens that enable the classification system to classify documents written in the different language. As such, the disclosed systems and methods may vastly reduce the time and resources required by traditional classification systems to generate a multilingual corpus of training documents.

In addition, the systems and methods described herein may improve the functioning of a computing device by efficiently and accurately classifying documents accessed or stored by the computing device. These systems and methods may also improve the field of document classification by generating multilingual corpora used to train machine learning classifiers more rapidly and with less human input than traditional methods.

Figure 2:
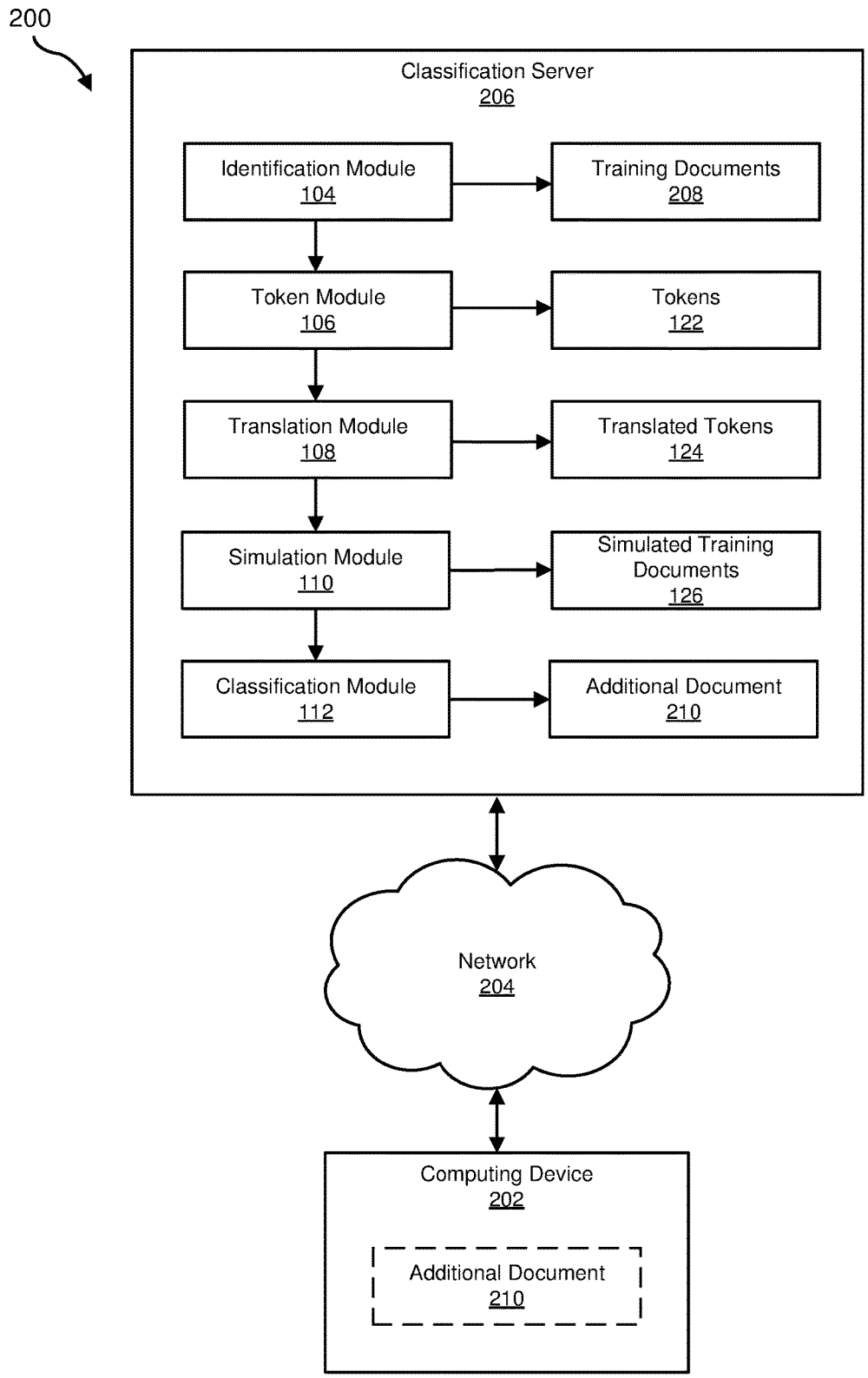
FIG. 2 is a block diagram of an additional example system for generating training documents used by classification algorithms.

The following will provide, with reference to FIGS. 1 and 2, detailed descriptions of example systems for generating training documents used by classification algorithms. Detailed descriptions of corresponding computer-implemented methods will also be provided in connection with FIG. 3. In addition, detailed descriptions of example training documents will be provided in connection with FIG. 4. Detailed descriptions of example simulated training documents will be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of an example system 100 for generating training documents used by classification algorithms. As illustrated in this figure, example system 100 may include one or more modules 102 for performing one or more tasks. As will be explained in greater detail below, example system 100 may include an identification module 104 that identifies a set of training documents used by a classification system to classify documents written in a first language. Example system 100 may also include a token module 106 that generates a list of tokens from within the training documents that indicate critical terms representative of classes defined by the classification system. In addition, example system 100 may include a translation module 108 that translates the list of tokens from the first language to a second language.

As will be explained in greater detail below, example system 100 may also include a simulation module 110 that creates, based on the translated tokens, a set of simulated training documents that enables the classification system to classify documents written in the second language. Finally, example system 100 may include a classification module 112 that classifies an additional document written in the second language based on the set of simulated training documents. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or classification server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate generating training documents used by classification algorithms. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120. In one example, additional elements 120 may include tokens 122. Tokens 122 generally represent any type or form of word, phrase, character, and/or symbol that indicates, characterizes, and/or represents a class into which a classification system sorts documents. In addition, additional elements 120 may include translated tokens 124, which generally represent the state of tokens 122 after one or more of tokens 122 have been translated into a different language. Additional elements 120 may also include simulated training documents 126, which generally represent any set of training documents that have been generated based on translated tokens 124. Simulated training documents 126 may enable a classification system to classify documents written in the language into which tokens 122 were translated.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a classification server 206 via a network 204. In one example, all or a portion of the functionality of modules 102 may be performed by computing device 202, classification server 206, and/or any other suitable computing system. As will be described in greater detail below, one or more of modules 102 from FIG. 1 may, when executed by at least one processor of computing device 202 and/or classification server 206, enable computing device 202 and/or classification server 206 to generate training documents used by classification algorithms.

For example, and as will be described in greater detail below, identification module 104 may cause classification server 206 to identify training documents 208 used by classification server 206 to classify documents written in a first language. Token module 106 may then cause classification server 206 to generate tokens 122 based on training documents 208. Next, translation module 108 may cause classification server 206 to translate tokens 124 from the first language to a second language (producing translated tokens 124). Simulation module 110 may then cause classification server 206 to create, based on translated tokens 124, simulated training documents 126 that enable classification server 206 to classify documents written in the second language. Finally, classification module 112 may cause classification server 206 to classify, based on simulated training documents 126, an additional document 210 that is written in the second language.

Computing device 202 generally represents any type or form of computing device capable of reading computer-executable instructions. In one example, computing device 202 may represent an endpoint device running client-side classification software. In this example, computing device 202 may send documents to a backend classification server, where the documents may be classified. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Classification server 206 generally represents any type or form of computing device that is capable of creating simulated training documents that enable a classification system to classify documents written in various language. In one example, classification server 206 may represent a backend server that classifies documents received from one or more endpoint devices (such as computing device 202). Additional examples of classification server 206 include, without limitation, security servers, application servers, web servers, storage servers, and/or database servers configured to run certain software applications and/or provide various security, web, storage, and/or database services. Although illustrated as a single entity in FIG. 2, classification server 206 may include and/or represent a plurality of servers that work and/or operate in conjunction with one another.

Network 204 generally represents any medium or architecture capable of facilitating communication or data transfer. In one example, network 204 may facilitate communication between computing device 202 and classification server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
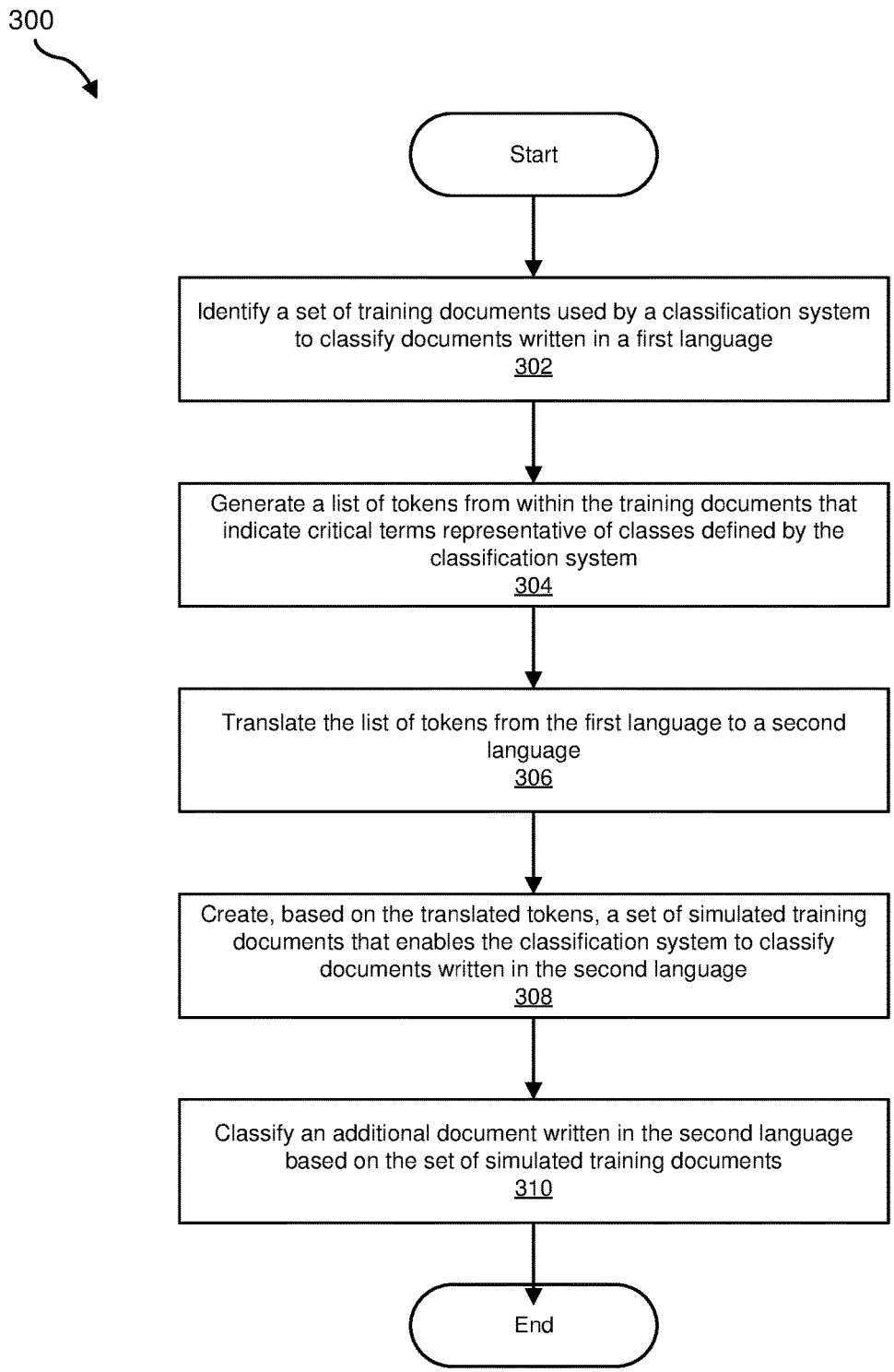
FIG. 3 is a flow diagram of an example method for generating training documents used by classification algorithms.

FIG. 3 is a flow diagram of an example computer-implemented method 300 for generating training documents used by classification algorithms. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a set of training documents used by a classification system to classify documents written in a first language. For example, identification module 104 may, as part of classification server 206 in FIG. 2, identify training documents 208.

The term "document," as used herein, generally refers to any type or form of file, media, portion of information, and/or formatted unit of data. A document may be a physical object (e.g., one or more pieces of paper), or may be stored and/or accessed digitally. Examples of documents include, without limitation, articles, contracts, books, magazines, letters, legal documents, applications, messages, websites, cloud-based platforms, images, photographs, and/or any additional type of document.

The term "training document," as used herein, generally refers to any document that represents or is associated with one or more classes (e.g., categories, types, labels, etc.). In some examples, a classification system may use a set of training documents to learn, discover, or deduce properties or characteristics of various document classes. The term "classification system," as used herein, generally refers to any machine learning algorithm, artificial intelligence program, and/or autonomous or semi-autonomous service that sorts documents into various classes.

In one example, a classification system may collect or assemble a group of training documents that are known to belong to particular classes. The classification system may then use a variety of statistical or computational analysis techniques to identify distinctive properties that distinguish documents within certain classes from documents within other classes. These properties may form or represent models of classes that the classification system may use to classify incoming documents. For example, a classification system may identify a document's class by comparing features of the document with features identified by models of document classes. In the event that at least a certain percentage or number of features of the document match features within a model of a document class, the classification system may determine that the document belongs to the class.

A collection of training documents used to train a classification system to classify documents may be referred to as a corpus. In some examples, corpora for traditional classification systems may be compiled or collected by hand. For example, a user (e.g., a classification expert) may review and select individual documents that exemplify different classes and provide the documents to a machine learning algorithm that autonomously or semi-autonomously (e.g., with user input) determines distinctive properties of the classes. Unfortunately, gathering a complete, comprehensive corpus that is representative of multiple classes may involve thousands of person-hours (and thousands, if not millions, of dollars). Accordingly, the disclosed systems provide more efficient methods for developing corpora for classification systems.

The disclosed systems may identify a set of training documents used by a classification system in a variety of ways. In some examples, identification module 104 may identify a previously-created set of training documents that have been used to train a classification system. For example, identification module 104 may identify an existing hand-collected corpus maintained by a classification system in which the disclosed systems operate. Identification module 104 may identify a set of training documents in any additional manner, such as by generating a set of training documents or identifying a publicly-available set of training documents.

In some embodiments, identification module 104 may identify a language (i.e., a human-spoken language) in which a set of training documents are written. For example, identification module 104 may determine whether the majority of documents within a corpus contain text written in English, Spanish, Mandarin, Arabic, etc. In some embodiments, identification module 104 may identify a specific or regional dialect of a set of training documents (e.g., Southern American English, British English, etc.). Identification module 104 may identify the language of a set of training documents in a variety of ways, such as by receiving input from a user (e.g., an administrator of a classification system) and/or analyzing text within the training documents.

Returning to FIG. 3, at step 304 one or more of the systems described herein may generate a list of tokens from within the training documents that indicate critical terms representative of classes defined by the classification system. For example, token module 106 may, as part of classification server 206 in FIG. 2, generate tokens 122 based on training documents 208.

The term "token," as used herein, generally refers to any word, phrase, character, symbol, or other type of term that indicates, characterizes, or represents a class into which a classification system sorts documents. A token associated with a document class may describe a feature that is found frequently and/or prominently within documents of the class. In some examples, a token may identify a term that is found more frequently within documents of a particular class than within documents of other classes. Accordingly, tokens identified within training documents may be used to predict or determine a class of an unclassified document. For example, a classification system may determine a class most suitable for a document based on a comparison between tokens associated with various classes and features of the document.

In some embodiments, a token may identify a placement or location of a term within a document. For example, in addition to determining that a term is found frequently within documents of a certain class, token module 106 may determine that the term is generally positioned in a certain manner within the documents. In some examples, the position or placement of a token within a document may be relevant to or indicative of the document's class. As an example, the term "shopping cart," when positioned within a button or clickable icon, may be indicative of online shopping services. However, when located in a body or general portion of text within a document, the term "shopping cart" may be representative of academic papers that discuss online shopping services. In other embodiments, a token may be evenly or randomly distributed within documents of a certain class (i.e., the token may be representative of the class regardless of its placement). As an example, token module 106 may determine that quotation marks, identified within any location of a document, are representative of literature.

The disclosed systems may generate a list of tokens from within a set of training documents in a variety of ways. In some examples, token module 106 may identify tokens associated with a class by identifying terms that have at least a certain statistical presence within training documents that belong to the class. For example, token module 106 may identify terms that are used with at least a threshold frequency (e.g., 1 out of every 100 terms) and/or terms that are used more frequently than other terms (e.g., more frequently than 95% of other terms).

In some embodiments, token module 106 may exclude or ignore commonly-used terms (such as prepositions, transition words, pronouns, etc.) when identifying tokens within documents, as these terms may not indicate the meaning, purpose, or content of a document. However, the disclosed systems may consider the distribution of these terms within a set of training documents to determine the overall tone and/or structure of a document class.

In some examples, token module 106 may identify terms that are repeated throughout a class of documents but that do not definitively define or represent the class. For example, token module 106 may identify terms that are found within multiple documents of a class but that are not used as frequently as all or a portion of the tokens that represent the class. In some embodiments, these terms may represent noise signals within a document class. While noise signals may not directly indicate the class of a document, the presence of noise signals within a document may alter (e.g., decrease) the statistical significance or weight of other tokens within the document. Accordingly, token module 106 may identify both tokens and noise signals within a set of training documents to determine the overall statistical properties and distribution of terms within a document class.

Figure 4:
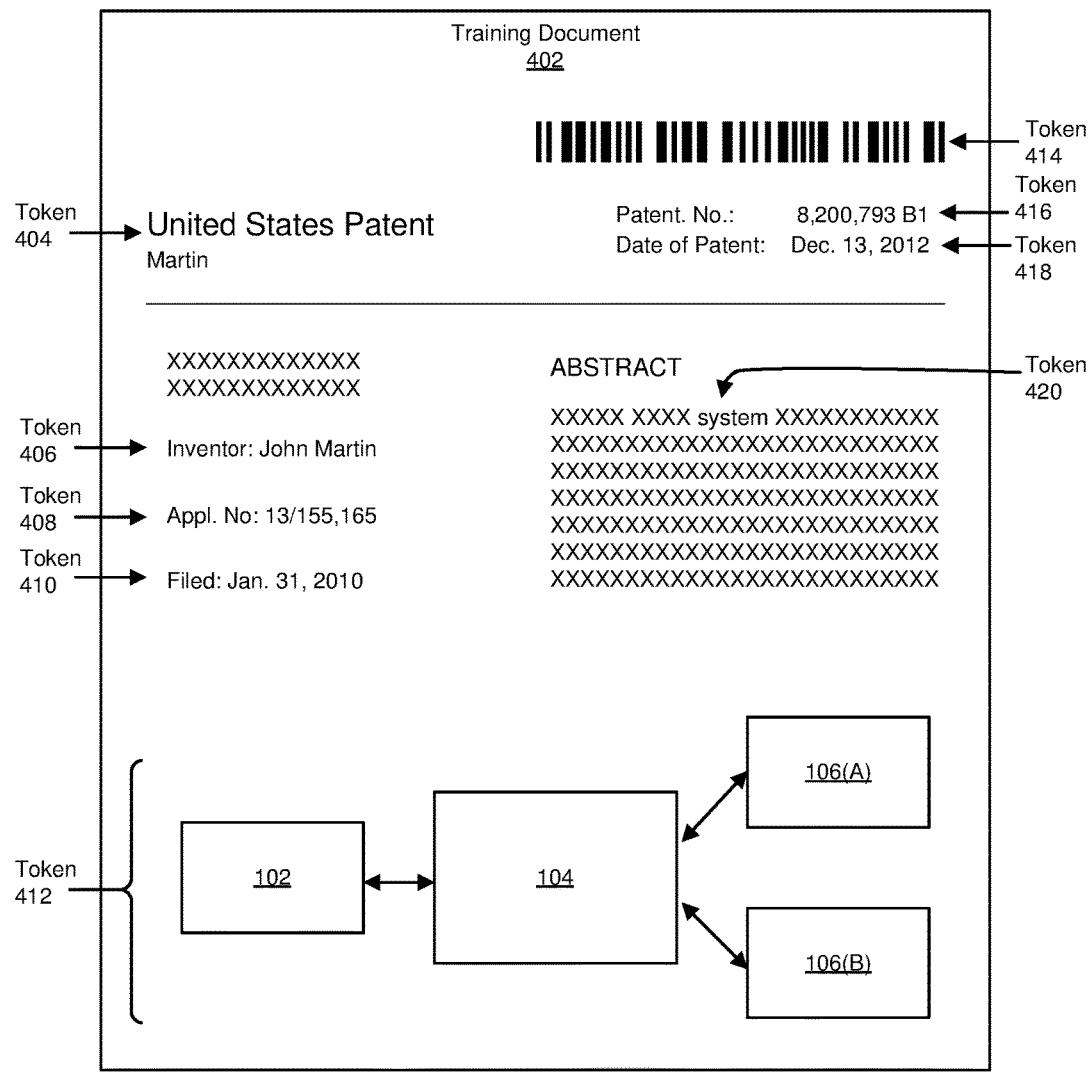
FIG. 4 is an illustration of an example training document.

FIG. 4 illustrates a portion of the tokens that may be contained within an example training document 402. In this example, training document 402 may represent the first page of an English-language patent. As shown in FIG. 4, a token 404 within training document 402 may correspond to the phrase "United States Patent." In one example, token 404 may represent a header that is generally found near the top-left corner of United States patents. As illustrated in FIG. 4, training document 402 may also include a token 406 that identifies an inventor that created the invention disclosed by the patent. Specifically, token 406 may correspond to the "inventor" field within training document 402, rather than the actual name (i.e., "John Martin") of the inventor. In addition, a token 408 within training document 402 may correspond to an "application number" field and a token 410 may correspond to a "filing date" field. As shown in FIG. 4, a token 412 within training document 402 may represent a drawing or set of figures. In addition, a token 414 may correspond to a barcode in the top-right section of training document 402. Furthermore, a token 416 may represent a "patent number" field and a token 418 may represent an "issue date" field. Finally, a token 420 may correspond to the word "system" within the "abstract" section of training document 402.

Returning to FIG. 3, at step 306 one or more of the systems described herein may translate the list of tokens from the first language to a second language. For example, translation module 108 may, as part of classification server 206 in FIG. 2, create translated tokens 124 by translating tokens 122.

The systems described herein may translate a list of tokens in a variety of ways. In some examples, translation module 108 may identify a language into which to translate a list of tokens (e.g., via input from an administrator of a classification system). Translation module 108 may then translate all or a portion of the tokens into the identified language in any manner that retains important linguistic properties of the tokens in their original language. For example, translation module 108 may analyze the context of a token within an original set of training documents to determine a proper usage or meaning of the token. Specifically, translation module 108 may identify a denotation or definition of a token (e.g., a literal meaning of the token). Translation module 108 may also identify a connotation, tone, sentiment, or other type of nuanced meaning of a token. Additionally or alternatively, translation module 108 may identify grammatical properties or a syntactic structure of a token. For example, translation module 108 may identify a part of speech (e.g., a verb, noun, etc.) that a token represents or determine whether a token is a regional word or phrase (such as an idiom or slang). Based on such analyses, translation module 108 may minimize losses to the meaning and context of a token during translation.

As an example, translation module 108 may determine that the token "bear" is used as a noun within a class of documents in the event that the token is included within a list of tokens that also contains the words "panda" and "bamboo." However, translation module 108 may determine that the token "bear" is used as a verb in the event that the token is included within a list of tokens that also contains the words "weight" and "limit." In another example, translation module 108 may determine that the token "race" refers to a distance-based competition within documents describing sporting events but refers to an ethnicity within documents analyzing social or cultural issues. As such, translation module 108 may properly translate homonyms, homographs, and any additional type of word or phrase that may have multiple meanings within a language.

In some embodiments, translation module 108 may transform or convert non-linguistic or non-text tokens that do not have a simple linguistic equivalent in a different language. For example, translation module 108 may modify tokens containing symbols, characters, locations, names, etc. such that the tokens correspond to a different language or geographic region. As an example, translation module 108 may switch a Euro currency symbol to a Japanese yen symbol when translating a list of tokens from French to Japanese. In another example, translation module 108 may change times of day from a 12-hour clock format to a 24-hour clock format (e.g., 6:35 PM to 18:35) when translating a list of tokens from American English to South African English.

In general, translating a list of tokens for a document class may be faster and easier than translating an entire set of training documents that represent the document class. For example, because a list of tokens may involve significantly fewer words and/or symbols than a set of training documents, the disclosed systems may conserve time and computing resources by translating the list of tokens (and then simulating training documents based on the translated tokens, as explained below), rather than performing a manual or automatic translation of an entire set of documents.

Returning to FIG. 3, at step 308 one or more of the systems described herein may create, based on the translated tokens, a set of simulated training documents that enables the classification system to classify documents written in the second language. For example, simulation module 110 may, as part of classification server 206 in FIG. 2, create simulated training documents 126 based on translated tokens 124.

The systems described herein may create a set of simulated training documents in a variety of ways. In some examples, simulation module 110 may model a set of simulated training documents based on properties of a set of original training documents of the same class as the simulated documents. In particular, simulation module 110 may emulate the original use (e.g., frequency, distribution, location, pattern, and/or contextual meaning) of one or more tokens within a simulated training document. Simulation module 110 may use a translated token within a simulated training document by replicating the use of the token within a single original training document (e.g., a one-to-one imitation), or based on an average or expected use of the token within a group of original training documents.

As an example, when simulating a German website based on an American website, simulation module 110 may place a URL within the simulated website in a location that matches a location of a URL within the American website. In this example, the domain name of the URL in the American website may contain non-translatable text (e.g., a company name). As such, simulation module 110 may directly replicate this text within the German website. However, simulation module 110 may modify the domain extension of the URL from ".com" to ".de" such that the simulated website accurately represents a typical German website. In another example, simulation module 110 may simulate a French memoir based on English memoirs by distributing the word "maison" (i.e., the French word for "home") within the simulated memoir based on an average frequency of the word "home" within a group of English memoirs.

In addition to emulating the original use of tokens within simulated training documents, simulation module 110 may imitate the structure of one or more original training documents. For example, simulation module 110 may copy a format, style, and/or arrangement of at least one training document. As an example, simulation module 110 may determine the average number of sentences in paragraphs within a set of training documents for a particular class and then structure paragraphs within a simulated document of the same class based on the determined number of sentences. In another example, simulation module 110 may imitate a font type, color scheme, and/or additional design element of an original training document within a simulated training document. In some embodiments, imitating the structure of original training documents within simulated training documents may enable a classification system to more accurately classify documents using the simulated documents.

Furthermore, simulation module 110 may generate a set of simulated training documents based on a distribution of multiple document classes within an original set of training documents. For example, simulation module 110 may determine that an original corpus contains twice as many documents of one class as documents of another class. Accordingly, simulation module 110 may generate twice as many simulated documents of the first class as simulated documents of the second class. In this way, simulation module 110 may ensure that the overall composition of a simulated set of training documents accurately represents the composition of an original corpus.

As discussed above, the disclosed systems may identify noise signals (e.g., low-frequency tokens) within original training documents. In some examples, simulation module 110 may replicate these noise signals within simulated training documents. For example, simulation module 110 may insert noise signals throughout a simulated training document such that the overall statistical profiles of tokens within the simulated training document match those of one or more original training documents. These noise signals may include low-frequency tokens or random words that have been translated and/or untranslatable tokens (such as proper nouns and punctuation symbols). In some examples, simulation module 110 may distribute each noise signal within a set of noise signals with the same frequency throughout a set of simulated training documents. For example, simulation module 110 may insert a single instance of a noise word or symbol across simulated training documents of a certain class. By generating noise signals within a set of simulated training documents, a classification system trained using the simulated training documents may correctly determine the significance or weight of tokens within the simulated documents.

In some examples, simulation module 110 may ensure that translated tokens are not placed within a simulated training document in a manner that changes or disrupts their meaning and/or statistical significance. For example, simulation module 110 may separate translated tokens using one or more filler words, punctuation sequences, etc. such that a classification system does not interpret the tokens as a single term or phrase. As an example, when distributing the tokens "high" and "quality" within a simulated training document, simulation module 110 may place the tokens in different sentences so that they do not appear to form the term "high quality."

In some embodiments, simulation module 110 may create simulated training documents that do not represent or contain human-readable content that seems natural or understandable to a speaker of the language of the documents. For example, simulation module 110 may distribute tokens within a simulated document amidst random or arbitrary words, phrases, images, and other terms of the appropriate language. As such, simulation module 110 may create training documents that contain important elements of various document classes, but may avoid the extensive time and computing resources required to generate entirely grammatically correct and/or comprehensible training documents (e.g., by translating each word and/or sentence of an original set of training documents).

The cost of creating a multilingual corpus of simulated training documents may generally be given by the formula $C=X+((N-1)*(W+Z))$, where C represents the total cost, X represents the cost of generating an original corpus, N represents the number of languages supported by the corpus, W represents the cost of translating a list of tokens, and Z represents the cost of generating a set of simulated training documents based on a list of translated tokens. In some examples, W and Z may approach zero (e.g., compared to X), and therefore the cost of generating a multilingual corpus may not be significantly greater than X. In contrast, the cost to generate a multilingual corpus using traditional methods (e.g., hand-compiling exemplary documents in each language and class) may be approximately $X*N$.

Figure 5:
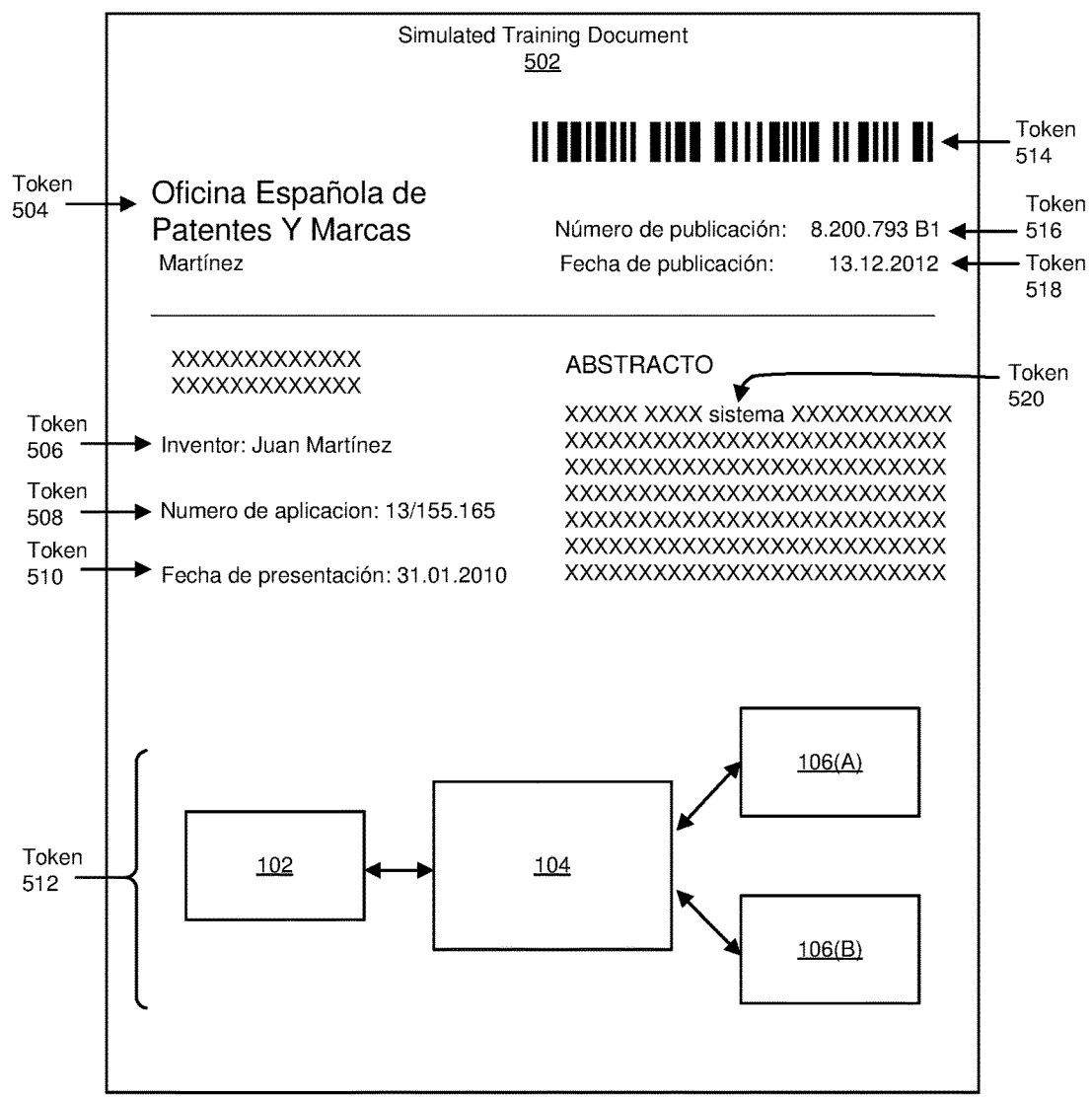
FIG. 5 is an illustration of an example simulated training document.

As an example of creating a simulated training document, FIG. 5 illustrates a simulated training document 502 that simulation module 110 may have generated based on training document 402 within FIG. 4. In this example, simulated training document 502 may represent the first page of a Spanish-language patent issued by the Spanish Patent and Trademark Office. As shown in FIG. 5, many of the tokens within simulated training document 502 may correspond to tokens within the English-language patent illustrated in FIG. 4. For example, a token 504 may correspond a header located near the top left-hand corner of simulated training document 502. Simulation module 110 may have included this header, containing the text "Oficina Española de Patentes Y Marcas," to indicate that simulated training document 502 represents a patent issued by the Spanish Patent and Trademark Office. In addition, a token 506 within simulated training document 502 may represent a field identifying an "inventor" (a cognate with the English word "inventor"). In this example, simulation module 110 may specify the name of the inventor as "Juan Martinez" based on the inventor name "John Martin" within training document 402.

Simulated training document 502 may also include a token 506 that represents a field identifying a "numero de aplicacion" (i.e., the Spanish translation of "application number"). In one example, simulation module 110 may populate this field by reformatting the application number identified within training document 402 based on typical European number formats (e.g., switching commas and decimals). In addition, simulated training document 502 may include a token 510 that represents a field for a "fecha de presentación" (i.e., the Spanish translation of "filing date"). Simulation module 110 may populate this field by reformatting the filing date within training document 402 based on typical date formats of patents issued by the Spanish Patent and Trademark Office.

As shown in FIG. 5, a token 512 within simulated training document 502 may represent a diagram matching the diagram of token 412 in FIG. 4. As token 412 may be composed of shapes, letters, and numbers that do not require translation, simulation module 110 may simply replicate token 412 within simulated training document 502. Similarly, simulation module 110 may replicate the barcode of token 414 as a token 514 in simulated training document 502. In addition, simulation module 110 may include, within simulated training document 502, a token 516 that corresponds to a "número de publicación" field and a token 518 that corresponds to a "fecha de publicación" field. Simulation module 110 may populate the values of these fields based on the values within tokens 416 and 418 in FIG. 4 (corresponding to a "publication number" and a "publication date," respectively). Finally, based on the word "system" represented by token 420 within the abstract section of training document 402, simulation module 110 may generate a token 520 that includes the term "sistema" within the "abstracto" section of simulated training document 502.

Returning to FIG. 3, at step 310 one or more of the systems described herein may classify an additional document written in the second language based on the set of simulated training documents. For example, classification module 112 may, as part of classification server 206 in FIG. 2, classify additional document 210 based on simulated training documents 126.

The systems described herein may classify a document based on a set of simulated training documents in a variety of ways. In some examples, classification module 112 may classify a document based on simulated training documents using the same or a similar process as is used to classify documents based on original (i.e., non-simulated) training documents. For example, because simulated training documents created by simulation module 110 may imitate the statistical, stylistic, and/or structural properties of original training documents, a machine learning algorithm that was trained to classify documents based on the original training documents may implement the same analysis techniques when classifying documents using the simulated training documents.

In one embodiment, classification module 113 may receive a document to be classified from a user or endpoint device. For example, the user may forward the document to classification module 112, which may be hosted on a back-end classification server. Once classification module 112 receives the document, classification module 112 may identify a language in which the document is written (e.g., via input from the user or based on an analysis of the document). Classification module 112 may then identify a classification model capable of classifying documents written in the identified language. This model may have been developed based on simulated training documents created by simulation module 110.

In some examples, classification module 112 may input the document to a machine learning algorithm or other classification program that classifies the document based on a comparison between the document's properties and features of the model. Classification module 112 may use the classification returned by the machine learning algorithm in any manner and/or perform any type of action in response to the classification. For example, classification module 112 may store the classification within the backend classification server. Additionally or alternatively, classification module 112 may provide the result of the classification to the user or endpoint device that requested the classification.

As discussed above in connection with FIG. 3, a classification system may generate a set of training documents used to train a machine learning algorithm to classify documents. In particular, the classification system may generate training documents used to classify documents written in a certain language based on an original set of training documents (e.g., a hand-compiled corpus) written in a different language. For example, the classification system may identify tokens (e.g., important or statistically-significant terms) within the original training documents and then translate the tokens into the desired language. The system may ensure that the correct context, usage and/or meaning of the tokens is retained during translation. The system may then use the translated tokens to create fake training documents in the desired language that are statistically and/or structurally similar to the original training documents. As such, the system may use the simulated training documents to train a machine learning algorithm to accurately and efficiently classify documents written in the desired language.

Figure 6:
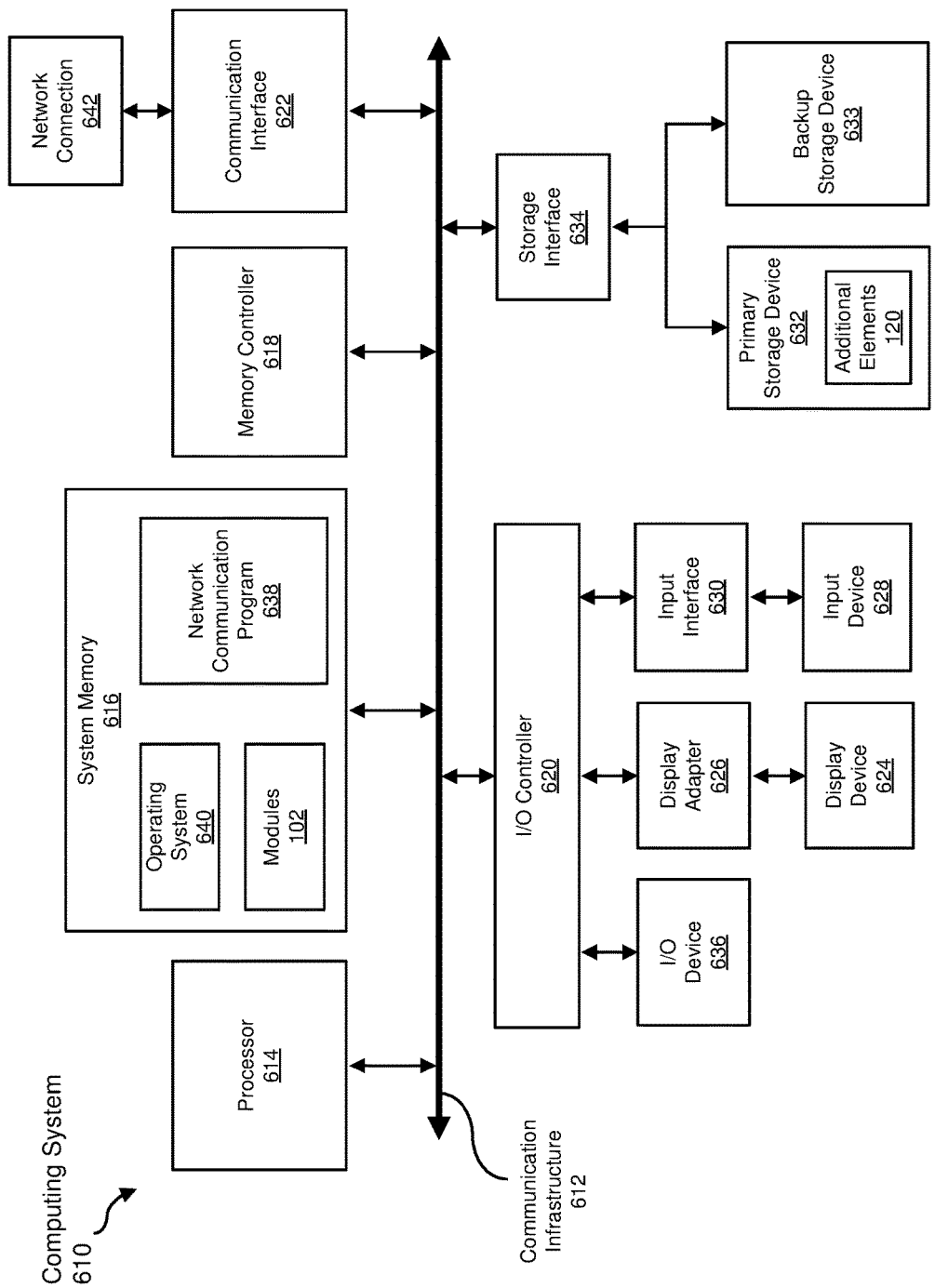
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
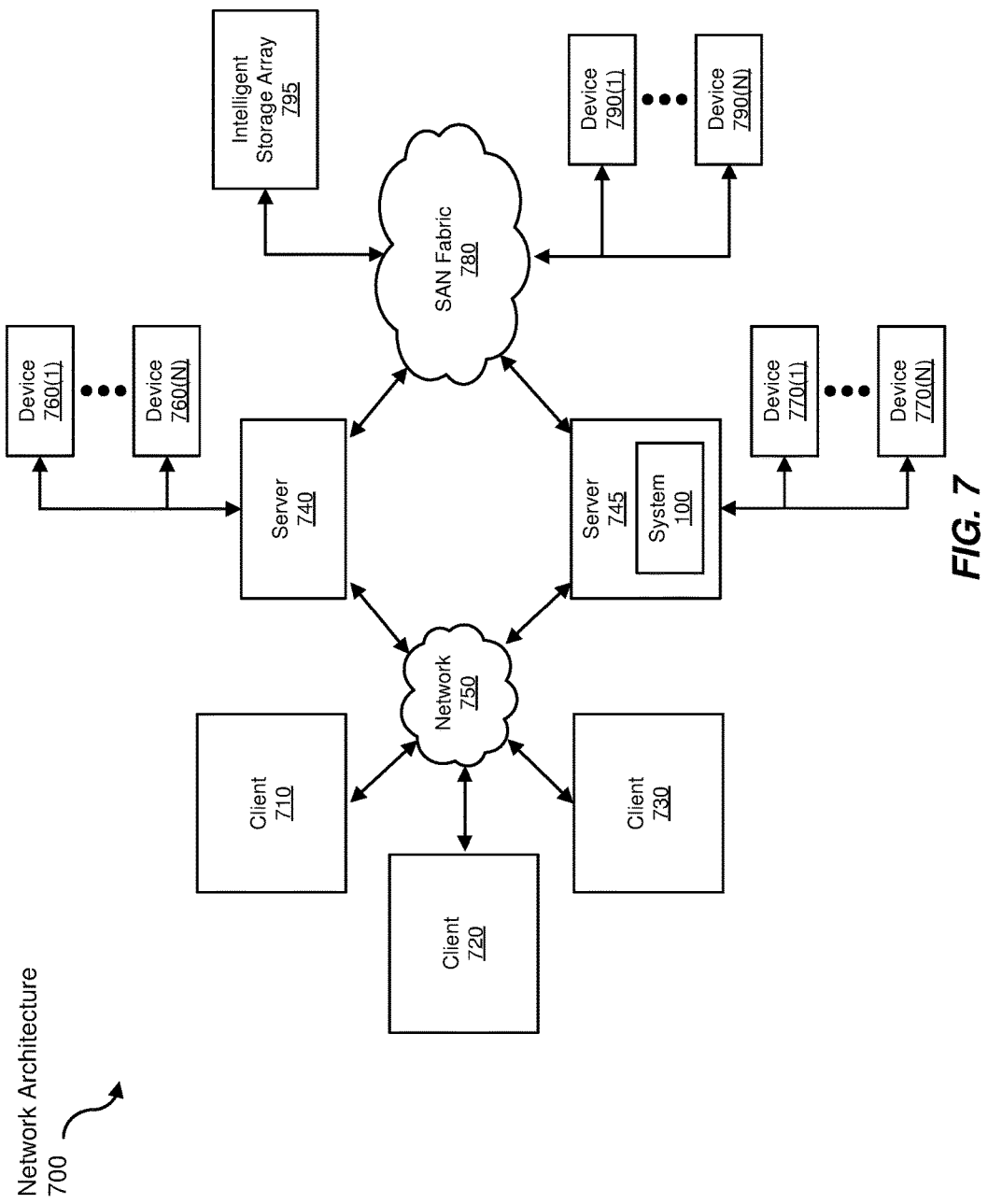
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for generating training documents used by classification algorithms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a set of training documents written in a first language to be transformed, transform the set of training documents into an additional set of training documents written in a second language, output a result of the transformation to a classification system, use the result of the transformation to classify documents written in the second language, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating training documents used by classification algorithms, at least a portion of the method being performed by a computing device comprising at least one processor, the method comprising:
    identifying a set of training documents used by a classification system to classify documents written in a first language;
    generating a list of tokens from within the training documents that indicate critical terms representative of classes defined by the classification system;
    determining linguistic properties of at least one token by analyzing a context in which the token is used within the set of training documents;
    translating, while retaining the linguistic properties of the token, the list of tokens from the first language to a second language;
    creating, based on the translated tokens, a set of simulated training documents that enables the classification system to classify documents written in the second language; and
    classifying an additional document written in the second language based on the set of simulated training documents.

2. The method of claim 1, wherein generating the list of tokens comprises identifying phrases that are used with at least a certain frequency within the set of training documents.

3. The method of claim 1, wherein generating the list of tokens comprises identifying non-linguistic tokens that indicate types of content within the set of training documents.

4. The method of claim 1, wherein the linguistic properties of the token comprise at least one of:
    a denotation of the token;
    a connotation of the token; and
    a syntactic structure of the token.

5. The method of claim 1, wherein translating the list of tokens is performed using fewer computing resources than are required to translate the set of training documents.

6. The method of claim 1, wherein creating the set of simulated training documents comprises structuring at least one simulated training document based on a structure of a training document within the set of training documents.

7. The method of claim 1, wherein creating the set of simulated training documents comprises distributing a token, after the token has been translated, throughout a simulated training document based on a distribution of the token throughout a training document within the set of training documents.

8. The method of claim 1, wherein creating the set of simulated training documents comprises:
    identifying, within the set of training documents, noise signals comprising non-token terms that reduce a statistical significance of at least one token; and
    replicating the noise signals within the set of simulated training documents.

9. The method of claim 1, wherein creating the set of simulated training documents comprises placing non-token terms between the translated tokens within the simulated training documents such that the translated tokens are not directly adjacent to other translated tokens.

10. The method of claim 1, wherein creating the set of simulated training documents comprises generating fake documents that contain text in the second language but do not contain content that is comprehensible by a speaker of the second language.

11. A system for generating training documents used by classification algorithms, the system comprising:
    an identification module, stored in memory, that identifies a set of training documents used by a classification system to classify documents written in a first language;
    a token module, stored in memory, that generates a list of tokens from within the training documents that indicate critical terms representative of classes defined by the classification system;
    a translation module, stored in memory, that:
        determines linguistic properties of at least one token by analyzing a context in which the token is used within the set of training documents; and
        translates, while retaining the linguistic properties of the token, the list of tokens from the first language to a second language;
    a simulation module, stored in memory, that creates, based on the translated tokens, a set of simulated training documents that enables the classification system to classify documents written in the second language;

a classification module, stored in memory, that classifies an additional document written in the second language based on the set of simulated training documents; and at least one physical processor configured to execute the identification module, the token module, the translation module, the simulation module, and the classification module.

12. The system of claim 11, wherein the token module generates the list of tokens by identifying phrases that are used with at least a certain frequency within the set of training documents.

13. The system of claim 11, wherein the token module generates the list of tokens by identifying non-linguistic tokens that indicate types of content within the set of training documents.

14. The system of claim 11, wherein the linguistic properties of the token comprise at least one of:
   a denotation of the token;
   a connotation of the token; and
   a syntactic structure of the token.

15. The system of claim 11, wherein the translation module translates the list of tokens using fewer computing resources than are required to translate the set of training documents.

16. The system of claim 11, wherein the simulation module creates the set of simulated training documents by structuring at least one simulated training document based on a structure of a training document within the set of training documents.

17. The system of claim 11, wherein the simulation module creates the set of simulated training documents by distributing a token, after the token has been translated, throughout a simulated training document based on a distribution of the token throughout a training document within the set of training documents.

18. A non-transitory computer-readable medium comprising one or more computer-executable instructions that, when executed by at least one processor of a computing device, cause the computing device to:
   identify a set of training documents used by a classification system to classify documents written in a first language;
   generate a list of tokens from within the training documents that indicate critical terms representative of classes defined by the classification system;
   determine linguistic properties of at least one token by analyzing a context in which the token is used within the set of training documents;
   translate, while retaining the linguistic properties of the token, the list of tokens from the first language to a second language;
   create, based on the translated tokens, a set of simulated training documents that enables the classification system to classify documents written in the second language; and
   classify an additional document written in the second language based on the set of simulated training documents.

* * * * *